United States Patent
Wang et al.

(10) Patent No.: US 8,074,956 B2
(45) Date of Patent: Dec. 13, 2011

(54) SUPPORT STAND

(75) Inventors: Jin-Xin Wang, Shenzhen (CN); Chao-Zhong Fu, Shenzhen (CN); Jian Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 312 days.

(21) Appl. No.: 12/344,669

(22) Filed: Dec. 29, 2008

(65) Prior Publication Data

US 2010/0051761 A1 Mar. 4, 2010

(30) Foreign Application Priority Data

Aug. 26, 2008 (CN) .......................... 2008 1 0304196

(51) Int. Cl.
*F16M 11/00* (2006.01)
*A47F 5/12* (2006.01)
*A47G 29/00* (2006.01)
*F16M 13/00* (2006.01)

(52) U.S. Cl. ..................... 248/688; 248/133; 248/372.1; 248/393; 248/397

(58) Field of Classification Search .................. 248/371, 248/372.1, 393, 397, 398, 923, 922, 133, 248/136, 688, 122.1
See application file for complete search history.

(56) References Cited

U.S. PATENT DOCUMENTS

| | | | | |
|---|---|---|---|---|
| 5,520,361 A * | 5/1996 | Lee | ............... | 248/398 |
| 5,564,163 A * | 10/1996 | Lowry et al. | ............... | 16/342 |
| 5,730,406 A * | 3/1998 | Chen | ............... | 248/223.41 |
| 5,799,372 A * | 9/1998 | Brunner et al. | ............... | 16/342 |
| 6,018,847 A * | 2/2000 | Lu | ............... | 16/337 |
| 6,085,388 A * | 7/2000 | Kaneko | ............... | 16/338 |
| 6,532,628 B2 * | 3/2003 | Kim | ............... | 16/342 |
| 6,570,627 B1 * | 5/2003 | Chang | ............... | 348/794 |
| 6,698,063 B2 * | 3/2004 | Kim et al. | ............... | 16/337 |
| 7,472,459 B2 * | 1/2009 | Lee et al. | ............... | 16/342 |
| 7,591,443 B2 * | 9/2009 | Lee et al. | ............... | 248/158 |
| 7,604,210 B2 * | 10/2009 | Oddsen et al. | ............... | 248/280.11 |
| 7,690,620 B2 * | 4/2010 | Lee | ............... | 248/676 |
| 7,706,138 B2 * | 4/2010 | Lee | ............... | 361/679.21 |
| 7,887,019 B2 * | 2/2011 | Yeh et al. | ............... | 248/372.1 |
| 7,913,357 B2 * | 3/2011 | Peng et al. | ............... | 16/321 |

FOREIGN PATENT DOCUMENTS

| | | |
|---|---|---|
| CN | 101149987 A | 3/2008 |
| KR | 10-2004-0089200 | 10/2004 |
| TW | M336656 | 7/2008 |

* cited by examiner

*Primary Examiner* — Terrell McKinnon
*Assistant Examiner* — Chiedu Chibogu
(74) *Attorney, Agent, or Firm* — Altis Law Group, Inc.

(57) ABSTRACT

A support stand includes a support member, a friction member, a first connecting bracket, and a second connecting bracket. The support member includes a base portion and two arched plates extending from an end of the base portion. The friction member is rotatably clamped by the arched plates. The first connecting bracket connected to a first end of the friction member. The second connecting bracket connected to a second end of the friction member opposite to the first end. The second connecting bracket is detachably attached to the first connecting bracket.

10 Claims, 6 Drawing Sheets

SUPPORT STAND

BACKGROUND

1. Field of the Invention

The present disclosure generally relates to support stands and, particularly, to a support stand for a flat-panel display monitor.

2. Description of the Related Art

A viewing angle of a display screen of a flat-panel display monitor can be adjusted by a support stand, so that users can view the display screen from different positions.

A typical support stand includes a monitor bracket, a hinge assembly, a support bracket, and a base member. The monitor bracket is attached to the flat-panel display monitor. The hinge assembly is connected to the monitor bracket and the support bracket. The support bracket is positioned on the base member. The hinge assembly includes a pivot shaft, a friction washer, a plurality of resilient washers, a rotary member rotatably sleeved on the shaft, and a fastening member. The rotary member and the shaft are fixed to the monitor bracket and the support bracket. The friction washer and the resilient washers are sleeved on the pivot shaft. The resilient washers create an axial force to push the friction washer to tightly resist the rotary member. The fastening member is fixed on an end of the pivot shaft to prevent the resilient washers and the friction washer from detaching from the pivot shaft. The monitor bracket together with rotary member may be positioned in any position relative to the shaft because of friction created between the friction washer and the rotary member.

However, the typical support stand includes many components, thus the cost of the typical support stand is relatively high. In addition, it is troublesome to assemble the support stand. Furthermore, over time, the friction causes abrasion of the engaging surfaces of the rotary member and the friction washer, resulting in little or no friction between the rotary member and the friction washer. Thus, the monitor bracket together with the rotary member would be incapable of remaining in any desired position. Therefore, the support stand has a relatively short usage life.

Therefore, a new support stand for a flat-panel display monitor is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION OF THE EMBODIMENTS

Figure 1:
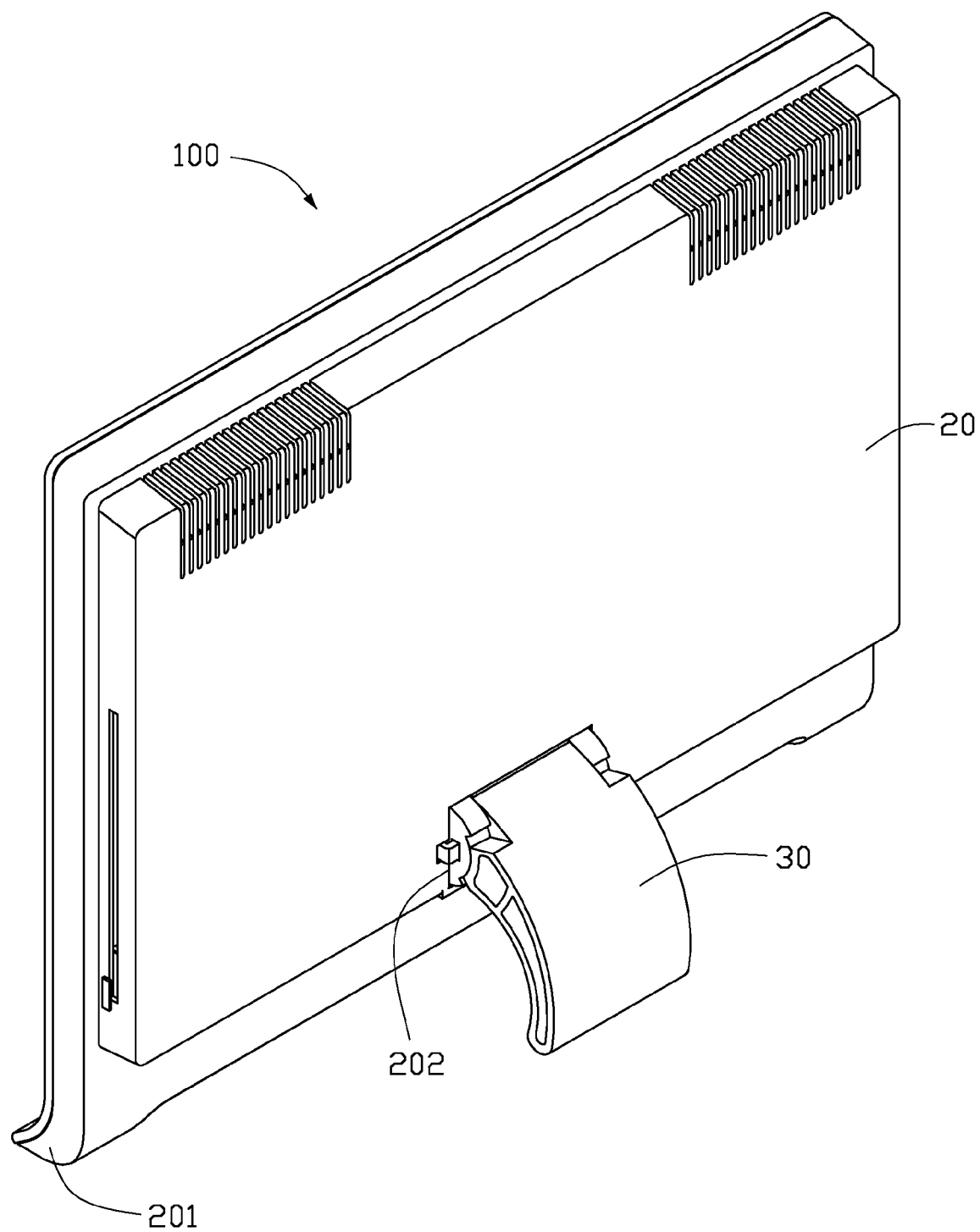
FIG. 1 is an assembled, isometric view of one embodiment of a flat-panel display monitor, the flat-panel display monitor including a support stand.

The present support stand may be used for electronic devices such as display devices and integral computers such as computers with display screens and host computers positioned in an integrally frame, and so on. Referring to FIG. 1, for the purposes of conveniently describing the present electronic device, one embodiment of a flat-panel display monitor 100 is described and illustrated.

The flat-panel display monitor 100 includes a display body 20, and a support stand 30 connected to the display body 20. The display body 20 includes a support portion 201 formed at an edge of the display body 20. The support portion 201 bends towards one side of the display body 20. The display body 20 further defines a latching groove 202 adjacent to a middle part of the support portion 201.

Figure 2:
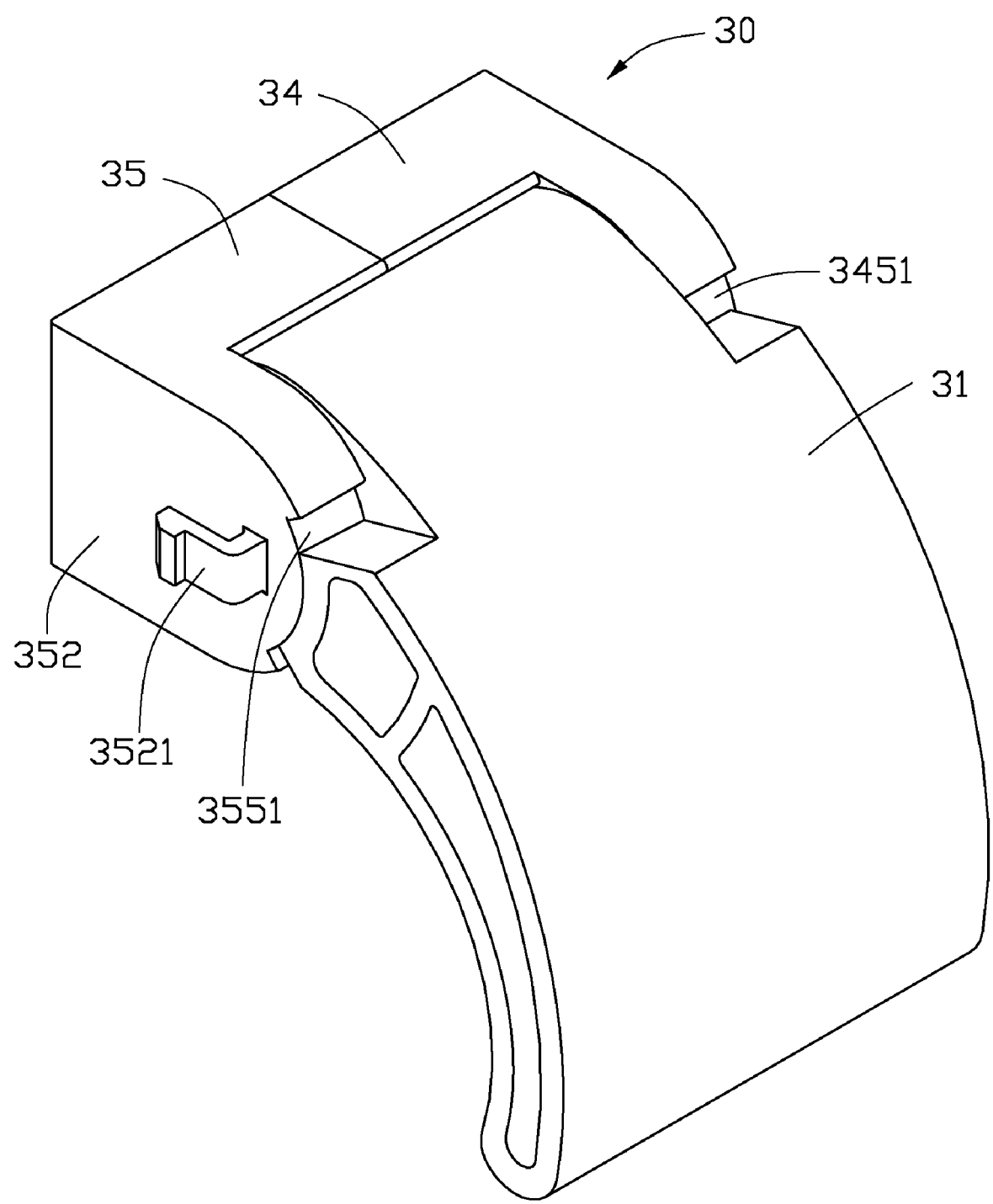
FIG. 2 is an assembled, isometric view of the support stand of FIG. 1.
Figure 3:
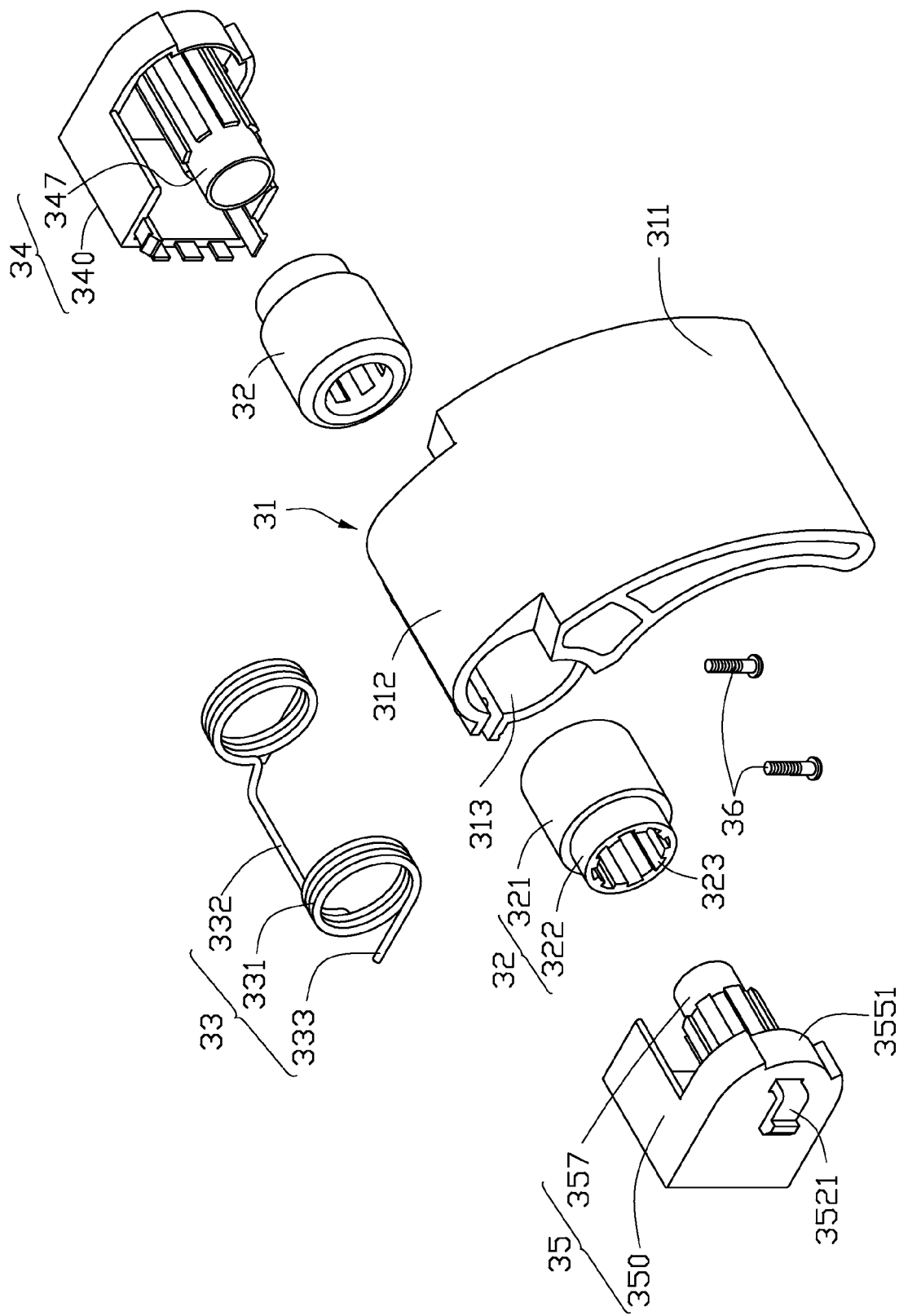
FIG. 3 is an exploded, isometric view of the support stand of FIG. 2 from another aspect.
Figure 4:
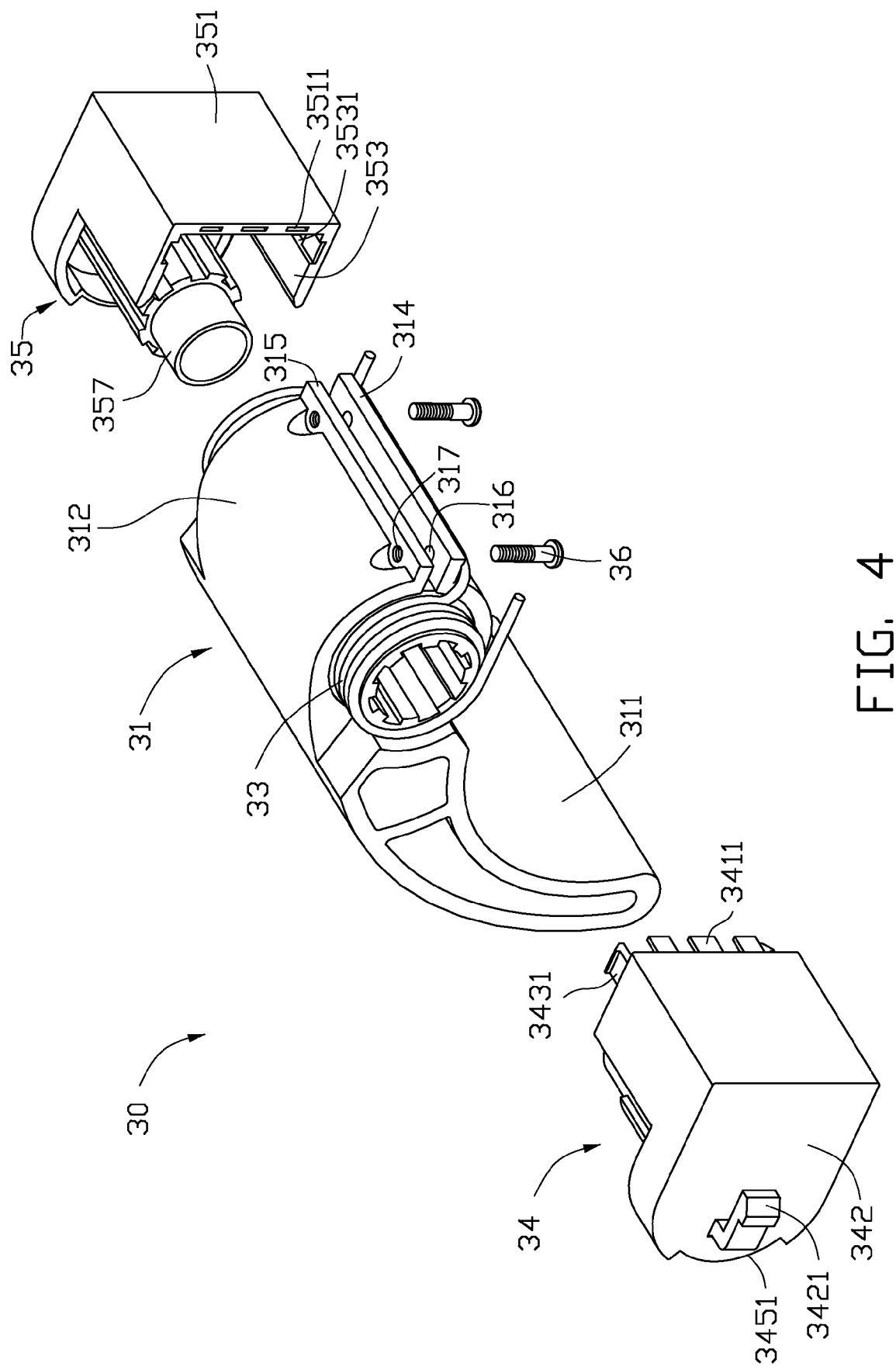
FIG. 4 is a partially exploded, isometric view of the support stand of FIG. 2 from another aspect.

Referring to FIGS. 2 through 4, the support stand 30 includes a support member 31, two friction members 32, a torsion spring 33, a first connecting bracket 34, a second connecting bracket 35, and two fixing members 36.

The support member 31 includes a hollow base portion 311 and two arched plates 312 extending from an end of the base portion 311. The base portion 311 may be substantially arched. The arched plates 312 cooperatively define a receiving hole 313. A first fixing portion 314 extends from an end of one of the arched plates 312 and a second fixing portion 315 extends from an end of the other one of the arched plates 312. The first and second fixing portions 314, 315 may be plate-shaped and substantially parallel to each other. The first fixing portion 314 defines two through holes 316 and the second fixing portion defines two threaded holes 317.

Each friction member 32 includes a substantially cylindrical friction portion 321 and a substantially cylindrical connecting portion 322 extending from an end of the friction portion 321. The friction member 32 defines an engaging hole (not labeled) extending through the friction portion 321 and the connecting portion 322. An outer diameter of the friction portion 321 is larger than an outer diameter of the connecting portion 322. An inner surface of the engaging hole uniformly defines a plurality of substantially parallel elongated grooves 323 less than a length of the friction member 32.

The torsion spring 33 includes two spring coils 331, a connecting arm 332 connecting the spring coils 331, and two resisting ends 333. Each resisting end 333 extends from each spring coil 331. A length of the connecting arm 332 is substantially equal to the length of the arched plate 312.

Figure 5:
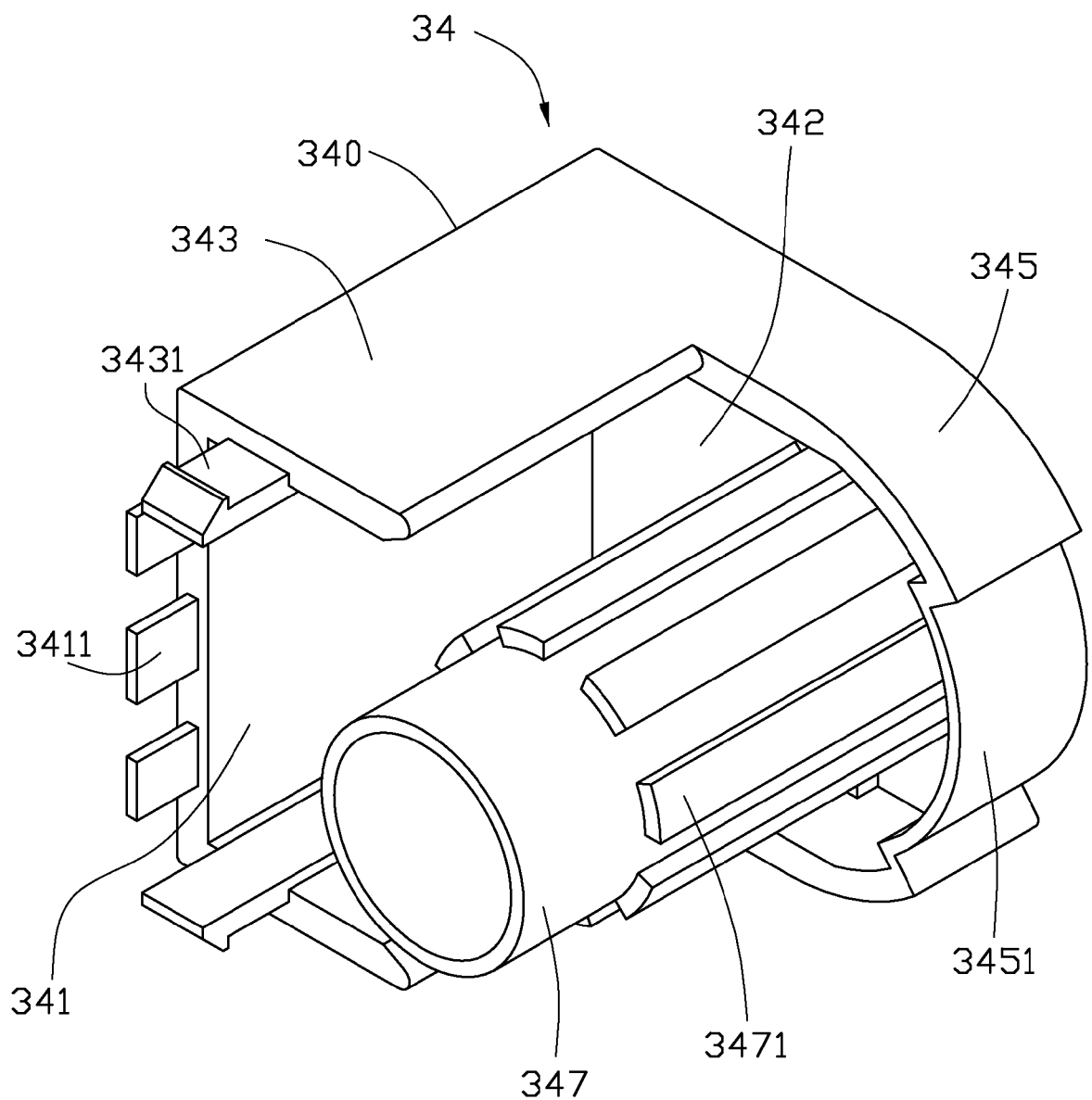
FIG. 5 is an isometric view of a connecting bracket of the support stand of FIG 2.

Referring also to FIG. 5, the first connecting bracket 34 includes a main body 340 and an engaging portion 347 connected to the main body 340. The main body 340 includes a first base wall 341, a second base wall 342, two first side walls 343, and a second side wall 345. The first base wall 341 is substantially perpendicularly connected to a side of the second base wall 342. The first side walls 343 extend substantially perpendicularly from opposite sides of the base wall 341 and are substantially perpendicular to the second base wall 342. The second side wall 345 may be arched in shape and extends substantially perpendicularly from the second base wall 342. Opposite ends of the second side wall 345 are connected to the first side walls 343. A plurality of positioning pieces 3411 extend from an end portion of the first base wall 341 away from the second base wall 342. A hook portion 3421 is formed on an outer surface of the second base wall 342. An end portion of each first side wall 343 away from the second base wall 342 forms a latching hook 3431. The second side wall 345 defines a restricting groove 3451. The engaging portion 347 is substantially a hollow cylinder extending substantially perpendicularly from an inner surface of the second base wall 342. The engaging portion 347 includes a plurality of substantially parallel elongated protrusions 3471 uniformly formed on an outer surface of the engaging portion 347. The elongated protrusions 3471 correspond to the elongated grooves 323 of the friction member 32.

The second connecting bracket 35 is similar in principle to the first connecting bracket 34 and includes a main body 350 and an engaging portion 357 connected to the main body 350. However, an end portion of a first base wall 351 away from a second base wall 352 defines a plurality of positioning holes 3511 to engage with the positioning pieces 3411 of the first connecting bracket 354, and an inner surface of each first side wall 353 defines a fixing groove 3531 to engage with the latching hook 343 of each first side wall 343 of the first connecting bracket 34.

The fixing members 36 may be screws.

The support member 31, the first and second connecting brackets 34, 35 may be made of a rigid plastic such as acrylonitrile butadiene styrene (ABS) or polycarbonate. The friction members 32 may be made of a soft plastic such as silica gel or polyurethane.

Referring to FIGS. 1 through 5 again, the friction portions 321 of the friction members 32 are inserted into the receiving hole 313 from opposite sides of the support member 31. The spring coils 331 of the torsion spring 33 are sleeved on the connecting portions 322 of the friction members 32, and the connecting arm 332 abuts one of the first fixing portion 314 and the second fixing portion 315. The fixing members 36 are passed through the through holes 316 of the first fixing portion 314, and screwed into the threaded holes 317 of the second fixing portion 315, so that the friction members 32 are rotatably clamped by the arched plates 312. The engaging portion 347 of the first connecting bracket 34 and the engaging portion 357 of the second connecting bracket 35 are inserted into the friction members 32. The positioning pieces 3411 of the first connecting bracket 34 are inserted into the positioning holes 3511 of the second connecting bracket 35, and the latching hook 3431 of the first connecting bracket 34 are latched into the fixing groove 3531 of the second connecting bracket 35. Thus, opposite sides of an end of the base portion 311 of the support member 31 are partially received in the restricting groove 3451 of the first connecting bracket 34 and a restricting groove 3551 of the second connecting bracket 35. One resisting end 333 of the torsion spring 33 abuts an inner surface of one of the first side walls 343 of the first connecting bracket 34 and the other resisting end 333 of the torsion spring abuts an inner surface of one of the first side walls 353 of the second connecting bracket 35.

After the support stand 30 is assembled, a portion of the first and second connecting brackets 34, 35 is latched in the latching groove 202 of the display body 20 via the hook portion 3421 of the first connecting bracket 34 and a hook portion 3521 of the second connecting bracket 35, thereby connecting the support stand 30 to the display body 20. When the flat-panel display monitor 100 is positioned on a support surface, such as a flat surface of a desk, the support member 31 of the support stand 30 and the support portion 201 of the display body 20 are supported by the support surface. Since friction is created between the support member 31 and the friction members 32, the support member 31 does not rotate relative to the display body 20. A viewing angle of the display body 20 may be adjusted by applying an external force on a top edge of the display body 20 or on the support member 31, so that the support member 31 is rotated relative to the display body 20. When the external force is released, the friction prevents the support member 31 from rotating relative to the display body 20. A rotating range of base portion 31 relative to the display body 20 is limited by the restricting groove 3451 of the first connecting bracket 34 and the restricting groove 3551 of the second connecting bracket 35.

The support stand 30 only includes several components, so the cost of the support stand 30 is relatively low and is simple to assemble the support stand 30. When the friction members 32 are rotatably clamped by the arched plates 312 of the support member 31, a clamping force between the arched plates 312 and the friction members 32 can be conveniently adjusted by varying the tension of the fixing members 36. Therefore, the friction between the support member 31 and the friction members 32 can be adjusted to adapt to display bodies with different weights. In addition, a contact surface between the friction members 32 and the arched plates 312 of the support member 31 is relatively large, so after repeated use, the friction is still sufficient for holding the support member 31 in any position, thereby prolonging a usage life of the support stand 30.

Figure 6:
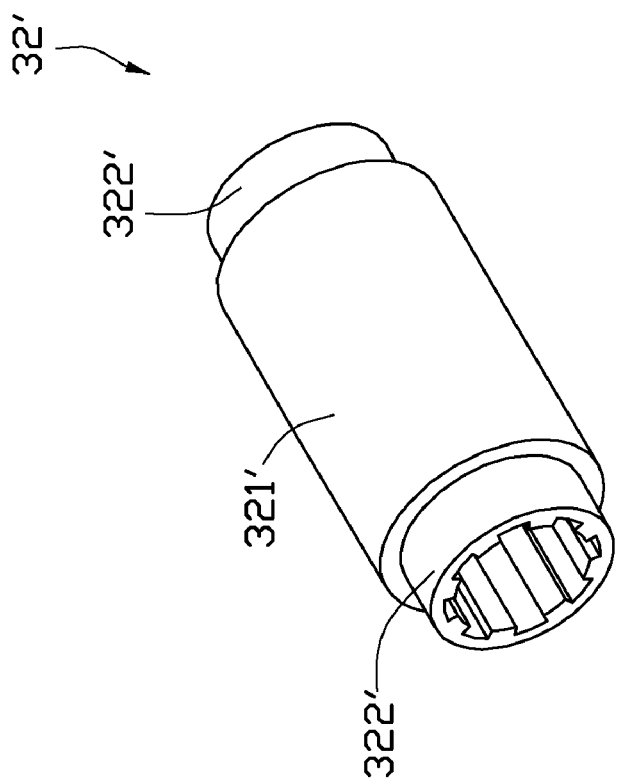
FIG. 6 is an isometric view of one embodiment of a friction member.

It may be appreciated that the torsion spring 33 may be omitted. In addition, the support stand 30 may include only one friction member 32' as shown in FIG. 6, including a friction portion 321' rotatably clamped by arched plates 312 of the support member 31 and two connecting portions 322' extending from opposite ends of the friction portion 321'. The connecting portions 322' may be connected to the engaging portion 347 of the first connecting bracket 34 and the engaging portion 357 of the second connecting bracket 35. The support member 31 and the first and second connecting brackets 34, 35 may also be made of other rigid materials, such as a powder metallurgy material.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A support stand, comprising:
   a support member comprising a base portion and two arched plates extending from an end of the base portion, the two arched plates cooperatively defining a receiving hole;
   a friction member rotatably clamped by the arched plates, the friction member comprising a cylindrical friction portion rotatably received in the receiving hole and two connecting portions, the two connecting portions extending from opposite ends of the friction portion and extending out of the receiving hole;
   a first connecting bracket connected to a first end of the friction member; and
   a second connecting bracket connected to a second end of the friction member opposite to the first end, wherein the second connecting bracket is detachably attached to the first connecting bracket; the first connecting bracket and the second connecting bracket are non-rotatably connected to the connecting portions; the friction member defines an engaging hole extending through the friction portion and the connecting portions; each of the first and second connecting brackets comprises a main body and an engaging portion connected to the main body; each engaging portion of the first and second connecting brackets is inserted into the engaging hole from the connecting portions of the friction member.

2. The support stand of claim 1, wherein the connecting portions are substantially cylindrically shaped; an outer diameter of the friction portion is larger than an outer diameter of each connecting portion.

3. The support stand of claim 1, wherein the friction member uniformly defines a plurality of substantially parallel elongated grooves in an inner surface of the engaging hole; each of the first and second connecting brackets includes a plurality of substantially parallel elongated protrusions uniformly formed on an outer surface of the engaging portion for latching in the elongated grooves of the friction member.

4. The support stand of claim 3, wherein each main body includes a first base wall, a second base wall, two first side walls, and a second side wall; the first base wall is substantially perpendicularly connected to a side of the second base wall; the first side walls extend substantially perpendicularly from opposite sides of the base wall and are substantially perpendicular to the second base wall; the second side wall is arched in shape and extends substantially perpendicularly from the second base wall and opposite ends of the second side wall are connected to the first side walls.

5. The support stand of claim 4, wherein each engaging portion is substantially a hollow cylinder extending substantially perpendicularly from an inner surface of the second base wall.

6. The support stand of claim 4, wherein the first connecting bracket comprises a plurality of positioning pieces extending from an end portion of the first base wall away from the second base wall; the second connecting bracket defines a plurality of positioning holes an end portion of the first base wall away from the second base wall; the positioning pieces engage in the positioning holes.

7. The support stand of claim 4, wherein the first connecting bracket comprises a latching hook formed an end portion of each first side wall away from the second base wall; the second connecting bracket defines a fixing groove in an inner surface of each first side wall to engage with the latching hook of the first connecting bracket.

8. The support stand of claim 1, wherein the support member further comprises a first fixing portion extending from one of the arched plates, and a second fixing portion extending from the other one of the arched plates; the first and second fixing portions are plate-shaped and substantially parallel to each other; the first fixing portion defines two through holes and the second fixing portion defines two threaded holes; the support stand further comprises two fixing members passed through the through holes, and screwed in the threaded holes so that a clamping force between the arched plates and the friction members is adjustable by adjusting the tension of the fixing members.

9. The support stand of claim 8, wherein the support stand further comprises a torsion spring comprising two spring coils, a connecting arm connecting the spring coils, and a resisting end extending from each of the spring coils; the spring coils are sleeved on the connecting portions, the connecting arm abuts one of the first fixing portion and the second fixing portion, and the resisting ends respectively abut the first connecting bracket and the second connecting bracket.

10. The support stand of claim 1, wherein the first and second connecting brackets are made of a rigid plastic and the friction members are made of a soft plastic.

* * * * *